United States Patent [19]
Drake et al.

[11] 4,155,169
[45] May 22, 1979

[54] COMPLIANT ASSEMBLY SYSTEM DEVICE

[75] Inventors: Samuel H. Drake, Lexington; Sergio N. Simunovic, Newton, both of Mass.

[73] Assignee: The Charles Stark Draper Laboratory, Inc., Cambridge, Mass.

[21] Appl. No.: 886,998

[22] Filed: Mar. 16, 1978

[51] Int. Cl.² .............................................. G01B 5/25
[52] U.S. Cl. ................................. 33/169 C; 33/185 R
[58] Field of Search ............ 33/169 C, 172 D, 180 R, 33/181 R, 185 R, DIG. 7, DIG. 13, 169 R, 1 M

[56] References Cited
U.S. PATENT DOCUMENTS

| | | | |
|---|---|---|---|
| 869,483 | 10/1907 | Dennis, Jr. et al. | 33/169 C |
| 2,490,483 | 12/1949 | Simer | 33/169 C |
| 2,735,731 | 2/1956 | Freebairn et al. | 33/DIG. 7 |

*Primary Examiner*—Richard E. Aegerter
*Assistant Examiner*—Willis Little
*Attorney, Agent, or Firm*—Joseph S. Iandiorio

[57] ABSTRACT

A compliant assembly system device including operator means for holding parts to be assembled; first and second interconnected deformable structures for supporting the operator means; the first deformable structure including a deformable portion having a first center being responsive to a force and to a moment applied to the operator means to permit rotation of the operator means about the first center; the second deformable structure including a deformable portion having a second center spaced from the first center and remote from the system, being responsive to a force and to a moment applied to the operator means to permit rotation of the operator means about the second remote center; the force causing generally equal and opposite offsetting rotations about the first and second centers which result in translational motion of the assembly device and a moment causing generally equal and opposite offsetting translations which result in rotation of the assembly device about an intermediate compliance center between the first and second centers at or near the parts to be assembled.

10 Claims, 13 Drawing Figures

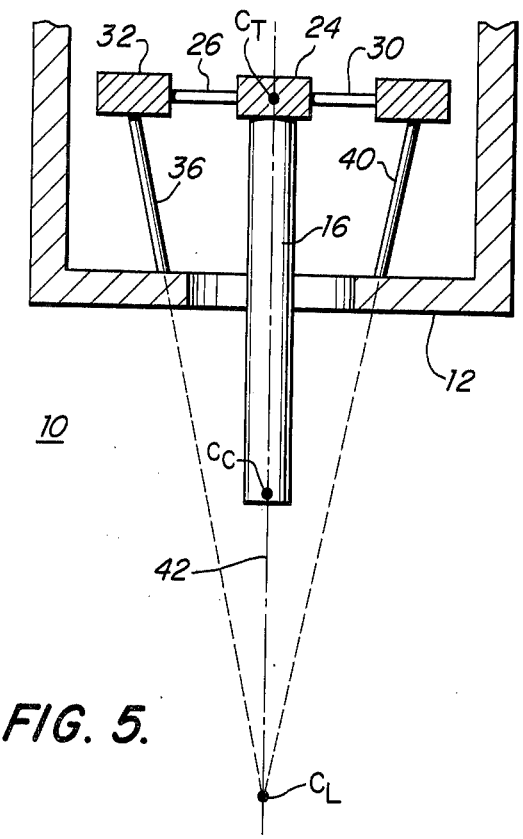
FIG. 5.
FIG. 7.
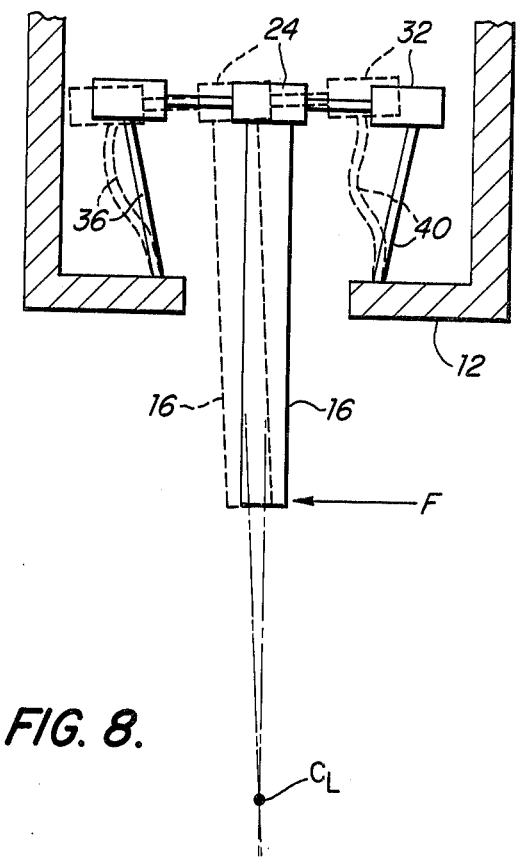
FIG. 8.
FIG. 9.
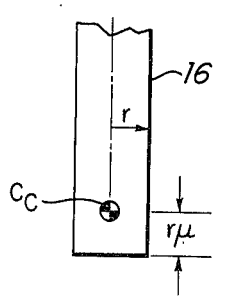
FIG. 10.
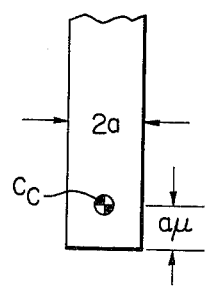
FIG. 11.

COMPLIANT ASSEMBLY SYSTEM DEVICE

FIELD OF INVENTION

This invention relates to a compliant assembly system device for compliantly supporting operator means for holding parts to be assembled, and more particularly to such a system which responds to translational and rotational forces applied to the operator means by enabling rotation of the operator means about two spaced centers resulting in an effective motion about a remote intermediate compliance point or center between the first and second centers operator means.

BACKGROUND OF INVENTION

Recently a new type of automatic assembly tool has been made known which uses a passive spring-loaded mechanism to provide translational and rotational motion. "High Speed Robot Assembly of Precision Part Using Compliance Instead of Sensory Feedback" by Samuel H. Drake, Paul C. Watson, and Sergio N. Simunovic; U.S. patent application Ser. No. 732,286, filed 10/13/76, "Remote Center Compliance System", Paul C. Watson. The rotational motion occurs about a compliance center at, near or beyond the tip of an operator member suspended or in some way supported by that mechanism. The center of compliance is defined as the point where a lateral force causes only a lateral deflection and a torque or moment causes only a rotational deflection. The translational motion portion of the mechanism consists of a number of parallel members, each having two spaced, discrete, hinge or pivot points about which the mechanism translates. The action envisioned in a single plane is that of a four bar linkage parallelogram. The rotational motion portion consists of a number of similar members which extend in the same general direction as the other members but which converge toward the rotational center at the tip of the operator member. Thus the center of rotation is set by the geometry of the converging members.

SUMMARY OF THE INVENTION

It is therefore an object of this invention to provide an improved compliance system for an assembly device which is easy to build to meet various design specifications.

It is a further object of this invention to provide such a system which is deformable or compliant.

It is a further object of this invention to provide such a system in which the rotational motion about two spaced centers results in motion about a compliance center intermediate the spaced centers.

It is a further object of this invention to provide such a system in which the compliance center location is a function of the relative stiffness or compliance of two different deformable portions.

The invention results from the realization that a compliance system for an assembly device can be made in which translational and rotational motions of an operator member occurring about two spaced centers result in rotational motion about an intermediate compliance center whose location is a function of the relative compliance or stiffness of deformable structures interconnecting operator means with a host apparatus.

The invention features a deformable structure compliance for an assembly system for compliantly supporting operator means. There are first and second interconnected deformable structures for supporting the operator means. The first deformable structure includes a deformable portion having a first center and being responsive to a force and to a moment applied to the operator means to permit rotation of the operator means about that first center. The second deformable structure includes a deformable portion having a second center spaced from the first center and remote from the system and being responsive to a force and to a moment applied to the operator means to permit rotation of the operator means about the remote second center. At a given point (the center of compliance) between the first and second point, the force causes generally equal and opposite offsetting rotations about the first and second centers, which result in translational motion of the operator means. The moment causes generally equal and opposite offsetting translations which result in rotation of the operator means about a remote intermediate compliance center between the first and second centers' operator means.

In a preferred embodiment, the first deformable structure may include at least three deformable portions extending radially outwardly from the first center, and the second deformable structure may include at least three deformable portions interconnected with the first deformable structure remote from the first center and extending transversely to the first deformable structure.

DISCLOSURE OF PREFERRED EMBODIMENT

Other objects, features and advantages will occur from the following description of a preferred embodiment and the accompanying drawings, in which:

FIG. 5 is a schematic cross-sectional diagram of the system of FIG. 2;

FIG. 7 is a schematic diagram of the response of the first generally laterally extending deformable structure to a moment applied to the operator means;

FIG. 8 is a schematic block diagram illustrating the response of a second generally longitudinally oriented deformable structure to a force applied to the operator means;

FIG. 9 is a schematic block diagram illustrating the response of the second generally longitudinally oriented deformable structure to a moment applied to the operator means;

FIG. 10 is a schematic diagram of a portion of the operator means showing preferred location of the center of compliance in a circular rod;

FIG. 11 is a view similar to FIG. 10 with respect to a square rod;

Figure 1:
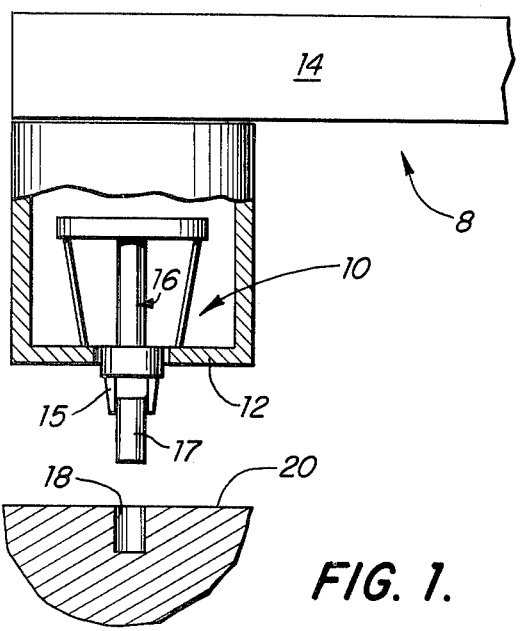
FIG. 1 is a diagrammatical illustration of a compliant assembly system device according to this invention.

The invention may be accomplished with a deformable structure compliance for a compliant assembly system supporting operator means for holding parts to be assembled. The system includes first and second interconnected deformable structures which support the operator means. The operator means or member is suspended from the first laterally oriented deformable structure, and the second longitudinally oriented deformable structure is fixed to a host apparatus. However, the operator means or member need not be suspended from the first deformable structure; it may extend upwardly or in any direction in three-dimensional space. In addition, the operator member need not necessarily be carried by the first deformable member; it may be carried by the second deformable member.

In this first disclosed embodiment the first deformable structure is typically laterally oriented with respect to the operator member axis and includes at least three deformable portions or beams which extend radially outwardly from a first center. This deformable structure and its beams are responsive to a translational force and to a moment applied to the free end of the operator member about the first center. Although the operator member is herein disclosed as a salient device for mating with a receptacle, the operator member may as well be a receptacle which mates with a salient device. The second deformable structure includes at least three deformable portions or longitudinal beams interconnected with the first deformable structure at some distance from the first center. These longitudinal beams extend generally transversely of the lateral beams of the first deformable structure and generally parallel to the operator member. These longitudinal beams are responsive to a translational force and to a moment applied to a free end of the operator member to permit rotation of the operator member about a remote second center spaced from the first center and beyond the end of the operator member. The translational force causes offsetting equal and opposite rotations of the operator member about the first and second centers which cancel and result in the translational motion of the operator member. The moment causes offsetting equal and opposite translations of the operator member which cancel and result in rotation of the operator member about a remote intermediate center, the compliance center of the device, which is located between the first and second centers at or near the parts to be assembled. The deformable portions of both structures may be discrete elements such as beams, or may be integrally formed. For example, the first deformable structure may be formed as a solid disk, planar, convex or concave, and the second deformable structure may be formed as a portion of a cylinder, cone, or sphere. Typically there is a peripheral rigid member intermediate the deformable portions of the first and second structures at the junction thereof. In preferred embodiments the operator member is supported by or suspended from the first deformable structure, typically the laterally oriented one. In preferred embodiments the intermediate compliance center is between the first end of the operator member and the first center of the first deformable structure.

There is shown in FIG. 1 a deformable structure compliance system 10 according to this invention mounted in a rotatable housing 12 rotatably supported by the arm of automatic assembly apparatus 14 which functions to attempt to grossly locate and align operator member 16 with respect to a cooperating member or hole 18 in the adjacent device 20. Operator member 16 may include a grip 15 for holding a part 17, hereafter omitted for simplicity, to be assembled in hole 18. In practice, the operator member may contain the hole and the adjacent device 20, a salient member. Rotatable housing 12 may be rotated for threadably engaging parts carried by operator member 16. Typically compliance system 10 is used to align parts carried by the operator member with parts on an adjacent device 20 which may be stationary or moving. Alternatively, the system could be used in docking and coupling applications.

Figure 2:
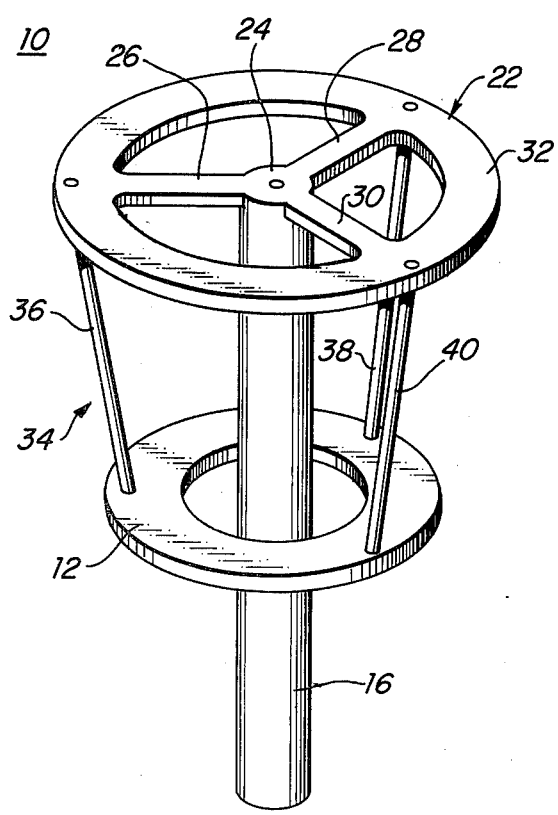
FIG. 2 is an enlarged axonometric view of the deformable compliance system of FIG. 1.

Deformable structure compliance system 10, FIG. 2, includes deformable structure 22, from the central portion 24 of which is suspended operator member 16. Deformable structure 22 also includes three radially extending beams 26, 28, and 30 which are equally spaced and terminate in an intermediate rigid annular member 32. Member 32 is carried by a second deformable structure 34, which includes three longitudinal beams 36, 38, and 40, which extend to a fixed portion such as housing 12, FIG. 1.

Figure 3:
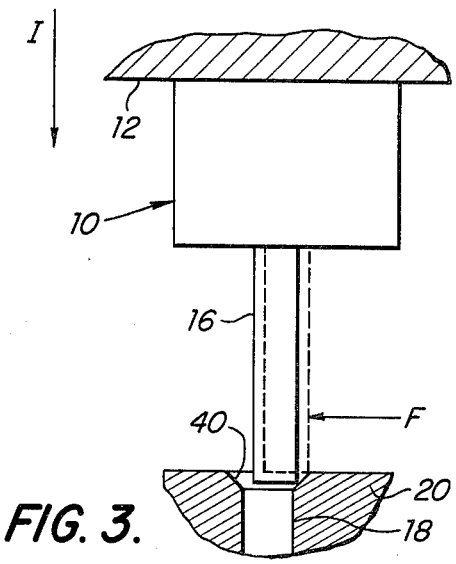
FIG. 3 is a schematic block diagram showing the compliance system of FIG. 1 performing translational motion according to this invention.
Figure 4:
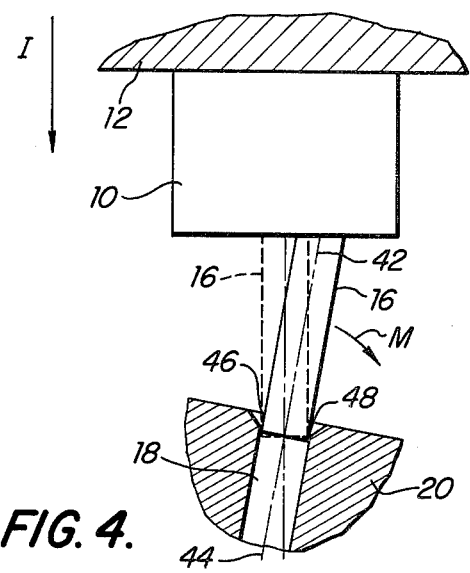
FIG. 4 is a schematic block diagram of the system of FIG. 1 performing rotational motion according to this invention.

In operation, system 10, FIG. 3, is moved axially with housing 12 to move operating member 16 into hole 18 in workpiece 20, because the axis of 16 is not coincident with the axis of 18 but may be displaced parallel thereto - contact is made at point 19, whereupon force F is developed. Fine adjustment occurs by translational motion permitted by system 10 in response to the force F developed on operator member 16 by the insertion force I. Similarly, with respect of the rotational action of system 10, with operating member or rod 16 located at hole 18 as in FIG. 4, alignment is not yet obtained because the axis 42 of rod 16 is not concident with the center axis 44 of hole 18. However, upon application of the insertion force I through housing 12 rod 16 makes contact at point 44 or 46, and then at the other; subsequent to which a rotational moment M is developed, in response to which system 10 permits rotation of rod 16 to the position shown in full lines, whereupon the axis 42 of rod 16 becomes coincident with the axis 44 of hole 18.

System 10, FIG. 5, includes two centers of rotation: upper center $c_T$, lower $c_L$, and the intermediate center of compliance $c_C$, about which the compliant motion of operating rod 16 occurs.

Figure 6:
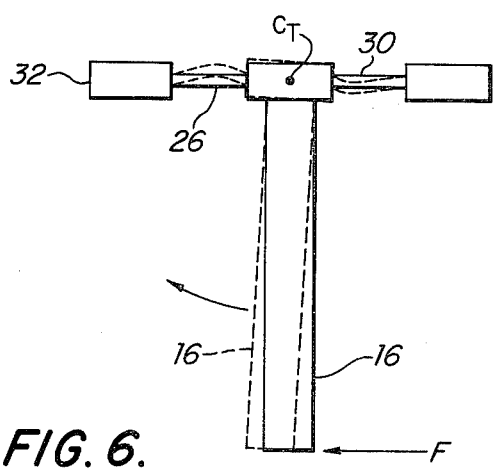
FIG. 6 is a schematic diagram illustrating the response of a first generally laterally oriented deformable structure to a force applied to the operator means.

Assuming the longitudinal beams are rigid, it is shown in FIG. 6 that a force F applied to operating member 16 causes a clockwise rotation of member 16 to a new position, shown in phantom, as member 16 rotates about the upper center of rotation $c_T$, which is approximately at the center of beams 26, 28, and 30. These beams deform or bend, as indicated, to the position shown in the dashed lines. Beams 26, 28, and 30, FIG. 7, respond similarly to a moment M which again causes clockwise rotation of member 16 about the upper center of rotation $c_T$.

Similarly, assuming for purposes of discussion that the lateral beams 26, 28 and 30 are rigid, then a force F, FIG. 8, applied to operator member 16, permits longitudinal beams 36, 38, and 40 to deform and permit operator member 16 to rotate in a counterclockwise direction about a lower center of rotation $c_L$ to the position shown in phantom.

Similarly, FIG. 9, a moment M applied to member 16 causes it to rotate in the clockwise direction as shown in phantom.

Thus the result of applying a force F to operator member 16 is the vector sum of the motion shown in FIGS. 6 and 8 for a lateral force, and the sum of the motions shown in FIGS. 7 and 9 for a moment, as long as the deformations are elastic. Since in FIGS. 6 and 8 the translations are in the same direction and the rotations are in the opposite direction, the proper choice of the lateral and angular stiffness of the springs of the lateral beams 28, 30, 32, and the longitudinal beams 36, 38, and 40, causes the two rotational motions to cancel each other, giving a desired effect of translation of the tip of the operator member without rotation in response to a pure translational force at the tip of the member.

Similarly, in FIGS. 7 and 9 the resulting rotations are in the same direction but the translational motions are in the opposite directions. Thus again the proper choice of the stiffness of the lateral beams and longitudinal beams causes the unwanted translations to cancel, resulting in only rotation about the tip of member 16 in response to a moment about the tip. Thus an effective center of compliance can be placed at the tip of the operator member. For uniform response, a symmetrical design uses three or more equally spaced beams, discrete or integral, in the lateral and the longitudinal structures.

Figure 12:
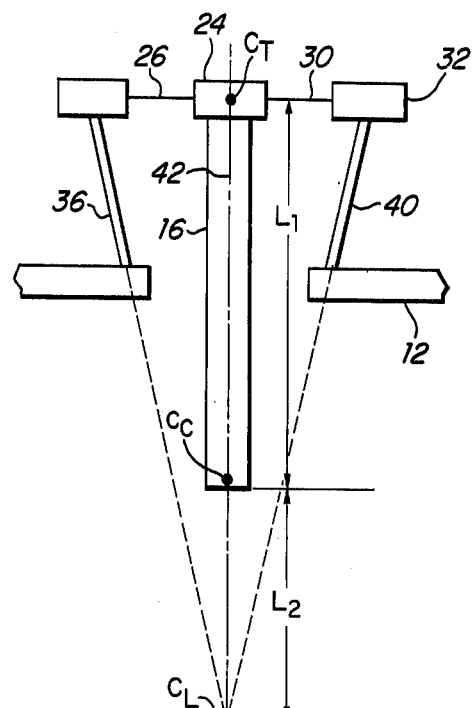
FIG. 12 is a diagram showing the location of the first center, the second center and the compliance center.

There are three parameters that it is desirable to specify, the location of the center of compliance $c_C$, the lateral stiffness seen at this point, and the rotational stiffness about this point. These parameters can be varied by varying the location of the virtual pivot point of the lateral structure $c_L$, the stiffness of the side or lateral structure, and the stiffness of the top or longitudinal structure. In mathematical terms, values should be specified for the distance from the top or longitudinal structure to the center of compliance $L_1$, FIG. 12, the lateral stiffness $K_l$ at the center of compliance $c_C$, and the rotational stiffness $K_\theta$ about the center of compliance $c_C$. The distance $L_2$ from the center of compliance $c_C$ to the virtual pivot or instant center of the lateral structure $C_L$ is determined by the relationship:

$$L_2 = (K_\theta L_1 K_l)$$

The rotational stiffness of the top or longitudinal structure $K_{\theta 1}$ is determined by the relationship:

$$K_{\theta 1} = (L_1 + L_2/L_2) K_\theta$$

where the subscript 1 is used to refer to the top or longitudinal structure and the subscript 2 is used to refer to the side or lateral structure. The lateral stiffness of the side or lateral structure $K_{l2}$ is determined by the relationship:

$$K_{l2} = (L_1 + L_2/L_2) K_l$$

Using these equations, suitable dimensions for the individual elements that comprise the top or longitudinal structure and the side or lateral structure can be determined with ordinary beam theory.

If the compliance center $c_C$ is at the tip of the operator member 16, good insertion or reception behavior results. Slight deviations from this location result in only slight degradation of behavior. However, it has been found that a good choice for the location of the compliance center $c_C$ is at a distance $r\mu$ inside of a round rod operator member 16, FIG. 10, where r is the radius of the rod and $\mu$ is the coefficient of friction between the rods and the hole into which it is being inserted or the operator hole and the peg on which it is being seated. If the operator member is actually a hole which is to be seated on a peg, the center of compliance $c_C$ should be back inside the hole by amount $r\mu$, where r is the radius of the hole.

If the operator member is square, the center of compliance $c_L$ may be placed inside the rod by an amount $a\mu$, FIG. 11, where a is half the length of the side of the square.

Figure 13:
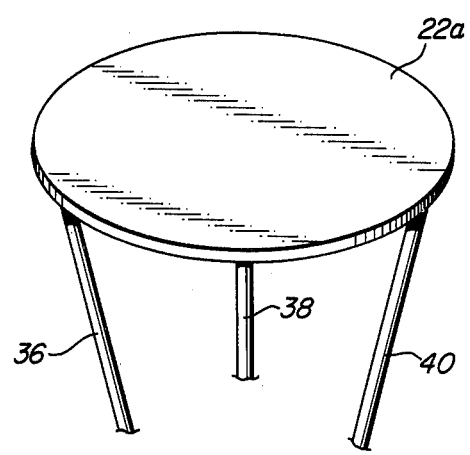
FIG. 13 illustrates an alternative, continuous diaphram form of the laterally oriented deformable structure.

Although the first deformable structure 22 has been shown in the preferred embodiment herein consisting of three discrete beams 26, 28, and 30, that is not a necessary limitation of the invention. As indicated previously, there may be more than three beams and the beams may be integral in the unitary structure, such as shown in FIG. 13 where the lateral deformable portion 22a is formed of a single disk, and the disk may be planar, convex or concave.

Other embodiments will occur to those skilled in the art and are within the following claims:

What is claimed is:

1. A deformable structure compliance for a compliant system comprising:
   operator means for holding parts to be assembled;
   first and second interconnected deformable structures for supporting said operator means;
   said first deformable structure including a deformable portion having a first center and being responsive to a force and to a moment applied to the operator means to permit rotation of the operator means about said first center;
   said second deformable structure including a deformable portion having a second center spaced from said first center and remote from said system and being responsive to a force and to a moment applied to the operator means to permit rotation of the operator means about said remote second center;
   said force causing generally equal and opposite offsetting rotations about said first and second centers which result in translational motion of the operator means and said moment causing generally equal and opposite offsetting translations which result in rotation of the operator means about a remote intermediate compliance center between said first and second centers at or near the points to be assembled.

2. The system of claim 1 in which said first deformable structure includes at least three deformable portions extending radially outwardly from said first center.

3. The system of claim 2 in which said second deformable structure includes at least three deformable portions interconnected with the first deformable structure, remote from the first center and extending transversely to the first deformable structure.

4. A deformable structure compliance for a compliant assembly system comprising:
   operator means for holding parts to be assembled;
   first and second interconnected deformable structures for supporting the operator means;
   said first deformable structure including at least three deformable portions extending radially outwardly from a first center and responsive to a force and to a moment applied to the free end of the operator means to permit rotation of the operator means about said first center;
   said second deformable structure including at least three deformable portions interconnected with the first deformable structure, remote from said first center and extending transversely to said first deformable structure and responsive to a force and to a moment applied to the free end of the operator means to permit rotation of the operator means about a remote second center spaced from said first center;

said force causing generally equal and opposite rotations about said first and second centers which result in translational motion of the operator means and said moment causing generally equal and opposite offsetting translations of the operator means which result in rotation of the operator means about a remote intermediate compliance center between said first and second centers' operator means.

5. The system of claim 4 in which said deformable portions of at least one of said deformable structures are discrete elements.

6. The system of claim 4 in which said deformable portions of at least one of said deformable structures are integrally formed.

7. The system of claim 4 in which said deformable portions of said second deformable structure converge towards said second center.

8. The system of claim 4 further including an intermediate rigid member for joining deformable portions of said first and second deformable structures.

9. The system of claim 4 in which the operator means interconnects with the center of said first deformable structure.

10. The system of claim 4 in which said deformable portions of said first deformable structure extend generally in the same plane.

* * * * *